April 17, 1928.   1,666,642
F. A. DILLINGHAM
WINDSHIELD
Filed April 10, 1924
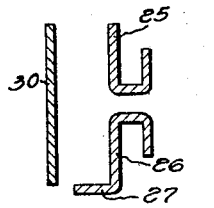
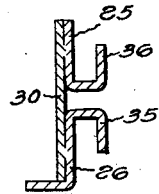
Fig. 3.   Fig. 4.   Fig. 5.
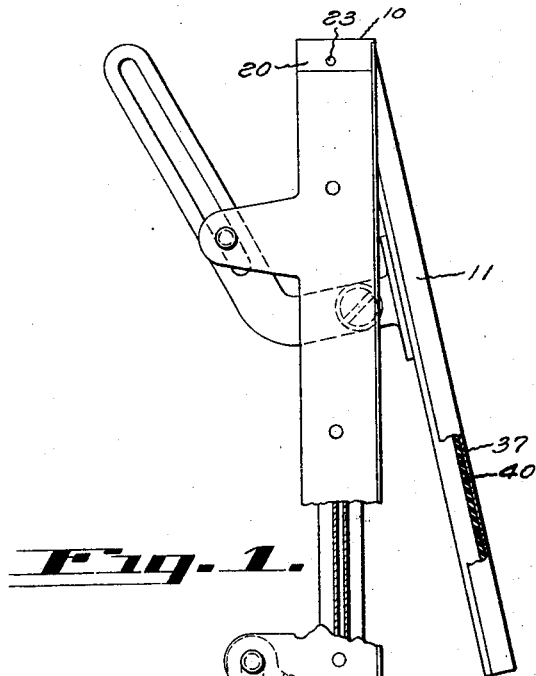
Fig. 1.
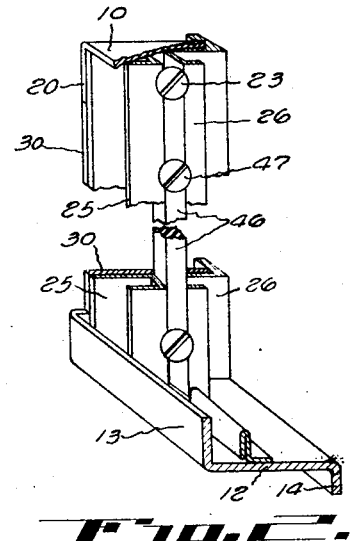
Fig. 2.
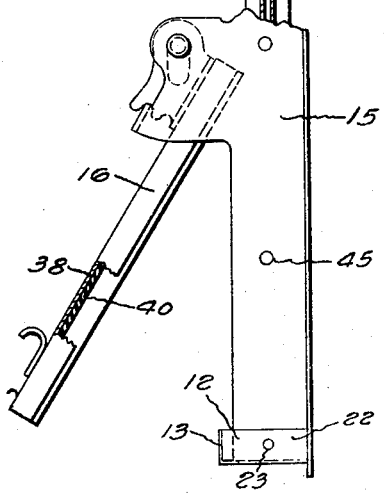
Inventor
Frederick A. Dillingham
By Marechal and Fish
Attorney Patented Apr. 17, 1928.

1,666,642

UNITED STATES PATENT OFFICE.

FREDERICK A. DILLINGHAM, OF TROY, OHIO, ASSIGNOR TO THE TROY SUNSHADE COMPANY, OF TROY, OHIO, A CORPORATION OF OHIO.

WINDSHIELD.

Application filed April 10, 1924. Serial No. 705,512.

This invention relates to windshields, primarily of the character used in automobiles, and to the fabrication of such windshields and the parts which go to make them up.

One of the principal objects of the present invention is to provide a windshield which is tight against leakage.

Another object of the invention is to provide a method of fabricating certain of the metal parts for an automobile windshield which provides improved parts at less cost.

A further object of the invention is to provide a method of fabricating metal bars for use as the side posts of windshields and for like uses, which method is simple and cheap in cost of carrying out.

Still another object of the invention is to provide an improved form of fabricated windshield, and the fabricated parts therefor, constructed in accordance with such method.

Other objects and advantages of the present invention will be apparent from the description set out below when taken in connection with the accompanying drawing, in which;

Fig. 1 is an end elevational view of a form of windshield embodying this invention, with certain parts thereof broken away to more clearly disclose the features of the invention;

Fig. 2 is a vertical view, in the nature of a perspective through the form of windshield illustrated in Fig. 1 showing the construction of the fabricated side posts;

Fig. 3 is a sectional view of the several parts which go to make up the fabricated side post, with the several parts arranged in somewhat the relative position in which they are placed before fabrication is effected;

Fig. 4 is a sectional view through the several parts shown in Fig. 3 after the parts have been rigidly connected together; and Fig. 5 is a sectional view of a somewhat modified form of side post bar.

Two goals are always aimed at in the designing of windshields such as are used for automobiles, and the like;—one of these is to provide a windshield that will not leak, the other to keep down the cost of manufacture. The windshield which forms the subject matter of this invention attains both of these goals.

The windshield illustrated herein is of the unitary type, in which the entire windshield is assembled as a unit ready to be fastened in position within the body of the automobile. Such a windshield consists of a top segment comprising a top member 10 and an upper windshield section 11, hinged, or otherwise pivotally secured to the top member 10; a bottom member 12, which in the form of windshield illustrated herein consists of a pan member having an upturned flange 13 upon the inner edge and a downturned flange 14 upon the outer edge, this construction being such that if any leakage through the windshield should occur the water thus leaking through would be caught by the pan 12 and returned to the outside of the car; and side posts 15, one at each end of the windshield, each of which is connected at its top and bottom ends respectively to the top member 10 and to the bottom pan 12, the two side posts having pivotally connected thereto the lower glass bearing section 16 of the windshield.

The windshield, as thus far described, is quite similar in construction, so far as regards the several elements thus far named, to the type of windshield shown in the copending application of Frederick A. Dillingham Serial No. 681,524, filed December 19, 1923.

The top member 10 consists of a flat metal strip to which the upper windshield section 11 is hinged, this top section 10 being provided with suitable holes through which screws or other suitable securing means are passed to rigidly fasten the top segment of the windshield to the body of the automobile. This top member 10 has its two ends downturned to form flanges 20, these two flanges in actual practice being about one-half inch wide, and adapted to be connected to the upper ends of the side posts.

The bottom pan 12 is also provided at each of its ends with an upturned flange 22, of substantially the same height as the flange 20 and each of these flanges is also adapted for connection to one of the side posts, and of course, to the bottom end of such side post. The bottom pan 12, and each of the side posts 15 is also provided with screw holes, through which are passed fastening screws for securely fastening the automobile windshield within the body of the automobile. These fastening screws hold the windshield firmly in place, without any possibility of the parts getting out of proper alignment after the windshield is fastened in place. But in order to facilitate assembling of the windshield in place, each of the flanges 20 and 22 is preferably provided with a fastening screw 23, which cooperates with suitable slots or passages in the respective ends of the side posts so that the four parts of the windshield frame may be assembled and held together so that the windshield may be handled as a unit.

The side posts 15 of course may be made in any desired manner but they are preferably fabricated posts. In fabricating these posts two strips of cold rolled steel, preferably of a thickness of approximately one-sixteenth of an inch, are passed through suitable dies, or otherwise treated, to form them into trough shaped strips or channels 25 and 26. The strips 25 and 26 are alike except that the strip 26 has one edge overturned as shown at 27, this overturned edge or flange cooperating with the body of the automobile when the windshield is in place. These two channel strips having been thus formed are spaced apart a suitable distance, this distance being preferably about one-eighth of an inch, although any other desired distance may be used. While the channel strips are thus spaced apart and held in properly spaced relation, a back support 30, consisting of a flat strip of cold rolled steel of the same thickness as the strips from which the channels 25 and 26 are formed is placed in position and rigidly secured to each of the two channel strips 25 and 26 so that the three pieces 25, 26 and 30 form a single unitary channel bar. Preferably the back support 30 is spot welded to the two channel members 25 and 26, but it may of course be connected in any other way. This channel bar, as thus fabricated, may be of any desired length. The several pieces forming the bar may be cut to just the exact length desired for the windshield in which they are to be used, and then welded together. Or, longer strips may be thus formed and welded together, after which pieces of any desired length may be cut off according to the type of windshield for which they are to be used.

In order to connect the top and bottom members of the windshield to the side posts, as stated above, each side post has adjacent its opposite ends a slot or passage to receive the assembling screws 23. If desired, screw holes may be formed in these side posts after they are fabricated, in the usual fashion. Or slots may be milled in the back support. Or the back support for a given side post may be cut shorter than the channel posts 25 and 26 of that side post by an amount equal to the combined heights of the two flanges 20 and 22. This shorter back support is then welded in position with its two ends spaced equally from the two ends of the two channel pieces 25 and 26, and when so constructed the opposite ends of each side post are uncovered by the back support so that the space between the two ends of the channel pieces forms a slot to receive the assembling screws 23. Where this construction is used the assembling of the several members of the windshield frame is quite simple, and it is merely necessary to slip the slotted ends of each side post over the screws in the cooperating ends of the top and bottom sections until the edges of the flanges 20 and 22 contact with the ends of the back support 30 and then tighten the screws 23.

This construction gives a very light, rigid, cheap and yet extremely satisfactory fabricated side post, and permits of considerably reducing the cost of the windshield over the heretofore known methods of forming such side posts.

Each of the side posts, when thus fabricated from channel pieces is provided with opposed channels the outer side walls of which form what are in effect oppositely extending ribs 35 and 36. And as shown in Fig. 1 of the drawing, the rib 35, which, when the windshield is assembled in place, is toward the outside of the car body cooperates with the upper movable windshield section 11, the end of the frame of this section having a cooperating channel, which receives the rib 35 when the section 11 is in closed position.

Likewise the rib 36, which extends toward the inside of the car body when the windshield is in assembled position, cooperates with the channel in the end of the frame of the lower movable windshield section 16, so that when that section is closed each of the ribs 36 is positioned within the channel in the cooperating end of the windshield section 16.

It has been found that a windshield of this character is practically free from leakage of water therethrough. However, in order to entirely preclude the leakage of water through the windshield even during the most severe driving rains, each of the channels 37 and 38 has positioned therein packing material 40, which is preferably in the form of a strip of rubber, these strips being, in the form of windshield shown, in cross section of about the dimensions 1/16" x 5/32". When the two sections of the windshield are closed these rubber packing strips contact with the ribs 35 and 36, and entirely preclude leakage of water through the windshield. Also they prevent leakage of air.

Each of the side strips 15, as stated above, is provided with screw holes 45 through which are passed suitable fastening screws to hold the windshield in place. The likelihood of any water leaking around the windshield and through these holes, along the screws, and into the car body is quite slight. But in order to entirely preclude any such leakage occurring the space or groove between the channel members 25 and 26 of the side posts has positioned therein packing 46 which is so arranged that it packs tight against the screws 47, which are passed through these screw holes 45 to hold the end sections in place. Preferably this packing consists of strips of rubber, of approximately 1/8" x 1/4" in cross section, the strips being of such length that they press tightly against the screws 47 when these screws are in position.

While the fabricated form of side posts shown constitutes a very satisfactory, and yet quite cheap form of side post, other types of side posts may be used if desired. In Fig. 5 for example is illustrated a somewhat different form of side post in which the side post is formed of a single strip of steel which is passed through a suitable die to bend it into the form desired. It will be noted that in cross section this form of side post is substantially the same as the form described above. But it is not as cheap to manufacture as the form described above and is not any more satisfactory in use.

Also the side posts may be made of malleable or other type of casting if desired. But this too has been found less desirable than the form of fabricated post described above.

While the forms of apparatus herein described constitute preferred embodiments of the invention, it is to be understood that the invention is not limited to these precise forms of apparatus, and that changes may be made in either without departing from the scope of the invention which is defined in the appended claims.

What is claimed is:

1. A windshield of the character described comprising a top frame member, a bottom frame member, and side-posts connecting said top and bottom frame members, each side-post comprising a fabricated bar consisting of two channel members, and a back support secured thereto to hold the channel members in spaced relation and providing a groove between said channel members, and means positioned within said groove for connecting the side-post to said top and bottom frame members.

2. A windshield of the character described comprising a top frame member, a bottom frame member, and side-posts connecting said top and bottom frame members, each side-post comprising a fabricated bar consisting of two channel members, and a back support secured thereto to hold the channel members in spaced relation and providing a groove between said channel members, said back support terminating short of the ends of said channel members at each end thereof whereby a slot opening through said side-post is provided at each end of said side-post, and fastening means positioned within said slots for connecting the side-post to said top and bottom frame members.

3. A windshield of the character described having a frame comprising horizontal and upright joined frame members, one of said members having a flange bent to lie along the other member, and an assembling screw operatively connected with said flange, said other member having a slot in the end thereof to receive the assembling screw, whereby the said members may be readily assembled as a unit.

4. As an article of manufacture a fabricated bar for use as a side post for windshields, or the like, consisting of two channel members, and a back support spot welded to said channel members to hold them in definitely spaced relation, said back support being shorter than the said channel members and spaced from the ends of the said channel members at each end of the back support to provide a slot between the uncovered ends of the channel members.

5. A windshield of the character described having a top member, a downturned flange at each end of said top member; a bottom member; an upturned flange at each end of said bottom member; an assembling screw in each of said flanges; and side posts, each connected at its two ends to the top member and bottom member respectively, each of said side posts having a slot in each end thereof to receive the cooperating assembling screw, whereby the windshield may be readily assembled into a unit.

6. A windshield of the character described, comprising a top segment; a top member associated with said top segment, a downturned flange at each end of said top member; a bottom member, an upturned flange at each end of said bottom member; an assembling screw in each of said flanges; and a fabricated side post for each end of said windshield, comprising two spaced channel members, and a back support shorter at each end than the said channel members to which it is connected by the width of the said upturned and downturned flanges.

7. A windshield of the character described, comprising a side post, oppositely extending outstanding ribs thereon; a movable upper section associated with said side post; a movable lower section associated with said side post, each of said movable sections having a channel therein to cooperate respectively, one with each of the oppositely extending outstanding ribs; and packing material within each of the said channels to contact with its cooperating rib and prevent leakage between the said movable sections and the said post.

8. In a windshield for automobiles and the like, a frame having a side post including spaced members, and means for holding said spaced members in spaced relation, said side post having holes therethrough for receiving fastening screws, or the like, to fasten the windshield in place within the body of the automobile; and packing material within the space between the spaced members of the said side post positioned to cooperate with the said fastening screws to prevent leakage along the said screws through the screw holes within the side post.

In testimony whereof I hereto affix my signature.

FREDERICK A. DILLINGHAM.